(12) United States Patent
Chapman

(10) Patent No.: US 11,585,327 B2
(45) Date of Patent: Feb. 21, 2023

(54) SPRING RETURN DEVICE

(71) Applicant: Kinetrol Ltd, Surrey (GB)

(72) Inventor: Roger Chapman, Surrey (GB)

(73) Assignee: KINETROL LTD, Surrey (GB)

(*) Notice: Subject to any disclaimer, the term of this patent is extended or adjusted under 35 U.S.C. 154(b) by 0 days.

(21) Appl. No.: 17/393,867

(22) Filed: Aug. 4, 2021

(65) Prior Publication Data

US 2022/0042496 A1 Feb. 10, 2022

(30) Foreign Application Priority Data

Aug. 10, 2020 (GB) ..................................... 2012421

(51) Int. Cl.
*F03G 1/02* (2006.01)
*F03G 1/08* (2006.01)

(52) U.S. Cl.
CPC ............. *F03G 1/022* (2021.08); *F03G 1/026* (2021.08); *F03G 1/08* (2013.01)

(58) Field of Classification Search
CPC .. F03G 1/022; F03G 1/026; F03G 1/08; F16F 1/10; F16F 1/127; F16F 1/128
See application file for complete search history.

(56) References Cited

U.S. PATENT DOCUMENTS 3,995,718 A * 12/1976 Nakamori ............... A63H 29/04
                                                                185/39
9,151,351 B2   10/2015 Underwood et al.
10,145,489 B2  12/2018 Underwood et al.
10,228,073 B2   3/2019 Underwood et al.
10,267,294 B2   4/2019 Chapman
(Continued)

FOREIGN PATENT DOCUMENTS

WO   WO 2011/154865       12/2011
WO   WO-2011154865 A1 * 12/2011 ................ F16F 1/10

OTHER PUBLICATIONS

WO_2011154865_description_translation.*
IPO Search Report for GB2012421.0 dated Jan. 18, 2021.

*Primary Examiner* — Phillip A Johnson
(74) *Attorney, Agent, or Firm* — Stephen J. Weyer, Esq.; Stites & Harbison, PLLC

(57) ABSTRACT

The present invention provides a spring return device comprising a rotatable drive coupling configured for releasably engaging a rotatable drive part on a first side of the device and configured for releasably engaging a rotatable drive part on an opposite second side of the device. A spring is engaged with the drive coupling, and a retainer retains the spring. The drive coupling is rotatable relative to the retainer, wherein rotation of the drive coupling relative to the retainer in a first direction causes mechanical energy to be stored in the spring. The spring return device further comprises a limiter element that is arranged to rotate with the drive coupling, and one or more stopping surfaces comprising a first stopping surface arranged to abut a first limiter surface on the limiter element when the drive coupling is in a first predetermined rotational position, to thereby limit rotation of the drive coupling relative to the retainer in a second direction, the second direction being opposite to the first direction. The spring return device of the invention may facilitate reversing the direction of operation of the spring return device.

20 Claims, 5 Drawing Sheets

(56) References Cited

U.S. PATENT DOCUMENTS

| | | |
|---|---|---|
| 2011/0051565 A1 | 3/2011 | Schmiedchen |
| 2013/0004358 A1 | 1/2013 | Underwood et al. |
| 2016/0161016 A1 | 6/2016 | Underwood et al. |
| 2016/0161021 A1 | 6/2016 | Underwood et al. |
| 2017/0002798 A1 | 1/2017 | Chapman |
| 2018/0326873 A1* | 11/2018 | Nacy .................. B60N 2/22 |
| 2019/0048856 A1* | 2/2019 | Morteza .................. F03G 1/08 |
| 2019/0072203 A1 | 3/2019 | Underwood et al. |

* cited by examiner

SPRING RETURN DEVICE

FIELD OF THE INVENTION

The present invention relates to a spring return device comprising a rotatable drive coupling and a spring engaged with the drive coupling, where rotation of the drive coupling in a first direction causes mechanical energy to be stored in the spring.

BACKGROUND TO THE INVENTION

Spring return devices are used as mechanical fail-safe devices. They are used to return mechanical devices, for example a valve, to a pre-determined safe condition using mechanical energy stored in a spring, typically a rotary spring such as a clock-spring.

A typical spring return device as conventionally used comprises a rotatable shaft, a clock-spring engaged with the rotatable shaft, and a retaining band surrounding the clock-spring and secured to the clock-spring by a retaining screw. When the rotatable shaft is rotated in a first direction relative to the retaining band, the clock-spring is wound up within the retaining band so that it stores mechanical energy and provides a torque on the rotatable shaft that acts to rotate the rotatable shaft in an opposite second direction. Thus, the effect of the clock-spring is to provide a force on the rotatable shaft that acts to counteract rotation of the rotatable shaft in the first direction.

In practice, a spring return device is typically used to apply a torque to rotate a rotatable shaft of a mechanical device, such as a valve, back to a predetermined position when the rotatable shaft is rotated away from the predetermined position to change an operational state of the mechanical device. In such an arrangement, the rotatable shaft of the spring return device is coupled to the rotatable shaft of the mechanical device, so that rotation of the rotatable shaft in the first direction causes mechanical energy to be stored in the clock-spring and a corresponding torque to be applied to the rotatable shaft that acts to rotate it in the second direction back to a predetermined position.

In practice, the predetermined position of the rotational shaft corresponds to a predetermined safe or desired operational state of the mechanical device, for example a position at which a valve is open or closed (depending on the particular circumstances).

Commonly, a spring return device is used in conjunction with a rotary actuator, such as an electric, pneumatic or hydraulic powered rotary actuator.

Rotary actuators are used to control the operation of mechanical devices by applying a torque to rotate a rotatable shaft of the mechanical device, e.g. to open or close a valve. For example, when a pneumatic rotary actuator is provided with a pressurised air supply, the pneumatic rotary actuator will provide a torque to rotate a shaft of the mechanical device to change an operational state of the mechanical device (e.g. to open or close a valve).

A spring return device can be used in conjunction with a powered rotary actuator to provide automatic return of the mechanical device controlled by the powered rotary actuator to a predetermined safe or desired condition in the event of the interruption or failure of power (e.g. electrical power, pneumatic power or hydraulic power) to the powered rotary actuator.

In the absence of a spring return device, in the event of unexpected interruption of power to the powered rotary actuator, for example in the event of the interruption of a pressurised air supply to a pneumatic rotary actuator, the mechanical device will stay in the operational state it was in at the time of the interruption. This operational state may be an unsafe or undesirable operational state of the mechanical device.

To overcome this problem, it is known to provide a spring return device in conjunction with the powered rotary actuator to provide a torque to return the rotatable shaft of the mechanical device to an orientation that corresponds to a predetermined safe or desired condition of the mechanical device in the event of interruption of power to the powered rotary actuator. Thus, the spring return device acts as a fail-safe device that prevents the mechanical device from remaining in an unsafe or undesirable operational state in the event of interruption of power to the powered rotary actuator.

Typically, the spring return device is positioned between the powered rotary actuator and the mechanical device, with the rotatable shaft of the spring return device coupled to both a rotatable driver shaft of the powered rotary actuator and a rotatable driven shaft of the mechanical device. Thus, when sufficient power is supplied to the rotary actuator, the driver shaft, the rotatable shaft of the spring return device, and the driven shaft are rotated in the first direction to change an operational state of the mechanical device, for example to open a valve. This rotation is against the torque provided by the clock-spring, and power must be continually provided to the powered rotary actuator to balance the torque provided by the clock-spring to maintain the driven shaft in the desired orientation.

In the event of interruption of power to the powered rotary actuator, the torque provided by the clock-spring will no longer be balanced by the powered rotary actuator, and therefore this torque will rotate the rotatable shaft of the spring return device, the driver shaft and the driven shaft in the second direction to change the operational state of the mechanical device to a predetermined state. Thus, the spring return device acts as a mechanical fail-safe device that returns the mechanical device to a predetermined state in the event of interruption of the supply of power to the powered rotary actuator.

Typically, it is desirable for the clock-spring of a spring return device to store a minimum amount of mechanical energy even when the rotatable shaft of the spring return device is at the predetermined position. This is commonly referred to as the spring preload.

Inadvertent release of energy stored in the spring (including the spring preload), such as a sudden popping out of the spring during assembly or disassembly, can cause serious injury to personnel or damage to equipment.

In some situations, it can be advantageous to reverse a direction of operation of a spring return device. In other words, it can be advantageous to have the ability to reverse a direction of the torque applied to the rotational shaft of the mechanical device by the spring return device, for example from a clockwise direction to an anticlockwise (counterclockwise) direction.

WO2013/008066 describes a method for reversing the direction of operation of a conventional spring return device. This method involves removing the mechanical energy stored in the spring before disengaging the retained spring from the rotatable shaft, removing the retained spring from the housing, inverting the retained spring, re-inserting the retained spring back in the housing including re-engaging the retained spring with the rotatable shaft, and storing mechanical energy in the spring. In this manner, the direction of operation of the spring return device is reversed.

GB2539922, by the present inventor, describes a spring return device which includes an integral locking mechanism that is actuatable to lock a rotational position of the device, in order to prevent a sudden release of energy stored in the spring.

SUMMARY OF THE INVENTION

At its most general, the present invention provides a spring return device which facilitates reversing the direction of operation of the spring return device. In particular, the spring return device comprises a rotatable drive coupling for engaging a rotatable drive part (e.g. shaft) of a mechanical device, the drive coupling being engaged with a spring such that rotation of the drive coupling in a first direction causes mechanical energy to be stored in the spring. Additionally, the spring return device is configured to limit rotation of the drive coupling in a second direction (opposite to the first direction), such that the drive coupling cannot rotate in the second direction beyond a predetermined rotational position of the drive coupling.

Thus, when the drive coupling is rotated in the first direction, mechanical energy is stored in the spring. So, similarly to the discussion above, the spring may counteract a torque applied in the first direction to the drive coupling via the rotatable drive part, e.g. in order to bias the mechanical device towards a predetermined state. However, as rotation of the drive coupling in the second direction is limited, it is possible to avoid a sudden release of all of the energy stored in the spring. So, for example, when the drive coupling is allowed to rotate in the second direction (e.g. by decoupling the rotatable drive part from the drive coupling or by switching off power to the mechanical device), the drive coupling may rotate until it reaches the predetermined rotational position to which rotation in the second direction is limited. In this manner, the drive coupling is prevented from freely spinning until all of the energy in the spring is released. Instead, an amount of mechanical energy may remain stored in the spring, whilst preventing further release of energy from the spring.

Thus, the spring return device can be safely disengaged from the rotatable drive part without any risk of the entirety of the stored mechanical energy in the spring being suddenly released, which might cause serious injury and/or damage to the mechanical device. In particular, as the drive coupling returns automatically to the predetermined rotational position under action of the spring, a risk of accidentally releasing all of the spring energy is reduced. Furthermore, this may enable the direction of operation of the spring return device to safely and easily be reversed. For example, the drive coupling may be allowed to return to the predetermined rotational position under action of the spring, at which point further rotation of the drive coupling in the second direction is prevented. Then, the rotatable drive part may be decoupled from the drive coupling, and the spring return device may be inverted, following which the rotatable drive part may be re-coupled to the drive coupling.

In contrast, the method for reversing the direction of operation of a spring return device disclosed in WO2013/008066 includes a large number of time consuming steps, including removing the mechanical energy stored in the spring, disassembling the spring return device, and reassembling the spring return device. In particular, removing the mechanical energy stored in the spring includes repeating a sequence of numerous time consuming steps multiple times in order to gradually reduce the mechanical energy stored in the spring, until all of the spring tension has been released, so that the spring can safely be removed from the housing to be inverted with minimal risk to personnel and equipment. These time consuming steps may be avoided with the spring return device of the invention, as the spring return device as a whole may be inverted whilst mechanical energy is still stored in the spring.

Additionally, in contrast to the spring return device of GB2539922, with the spring return device of the present invention it is not necessary to actuate any locking mechanism in order to ensure that mechanical energy remains stored in the spring. Rather, energy is automatically stored in the spring, by virtue of the limited rotation of the drive coupling in the second direction. Thus, reversing the direction of operation of the spring return device may be simplified. Additionally, a safety of this procedure may be improved, as the spring return device of the present invention may minimise the risk of accidental release of all of the spring energy (e.g. which may occur where a user fails to operate the lock mechanism of the spring return device in GB2539922).

According to a first aspect of the invention, there is provided a spring return device comprising: a rotatable drive coupling configured for releasably engaging a rotatable drive part on a first side of the device and configured for releasably engaging a rotatable drive part on an opposite second side of the device; a spring engaged with the drive coupling; a retainer that retains the spring, wherein the drive coupling is rotatable relative to the retainer, and wherein rotation of the drive coupling relative to the retainer in a first direction causes mechanical energy to be stored in the spring; a limiter element that is arranged to rotate with the drive coupling; and one or more stopping surfaces comprising a first stopping surface arranged to abut a first limiter surface on the limiter element when the drive coupling is in a first predetermined rotational position, to thereby limit rotation of the drive coupling relative to the retainer in a second direction, the second direction being opposite to the first direction.

Thus, when the drive coupling is in the first predetermined rotational position, the first limiter surface abuts the first stopping surface, such that further rotation of the drive coupling in the second direction is prevented. In this manner, the spring may be prevented from releasing all of its stored energy, and energy can remain safely stored in the spring when the drive coupling is in the first predetermined rotational position. As discussed above, this may improve a safety of the spring return device, as well as facilitate reversing the direction of operation of the spring return device.

The term rotatable drive coupling may mean a rotatable part of the spring return device that is configured, adapted or arranged for releasably engaging a rotatable drive part.

The drive coupling may have a female coupling part, for example an opening or a bore, for receiving a rotatable drive shaft. Alternatively, or in addition, the drive coupling may have a male coupling part, for example a protrusion or a shaft, for being received in an opening or a bore of a rotatable drive part.

The rotatable drive coupling may be rotatable about a central axis thereof.

The term rotatable drive part may mean any part that is rotatable and that can be used as part of a drive system for driving rotation of a mechanical device such as a valve. A rotatable drive part may refer to a rotatable part having a male and/or female coupling parts or portions.

In some cases, the rotatable drive part may be part of an actuator for driving rotation of the drive coupling, or part of a mechanical device for being driven by rotation of the drive coupling. Alternatively, the rotatable drive part may be an intermediate part that rotationally couples the drive coupling to the actuator or to the mechanical device. For example, the rotatable drive part may be a rotatable part of an adaptor for converting a female coupling part of the drive coupling to a male coupling part, or for converting a male coupling part of the drive coupling to a female coupling part.

Releasable engagement between the drive coupling and the rotatable drive part means that the rotatable drive coupling rotates together with the rotatable drive part and can be disengaged (i.e. separated) from the rotatable drive part. For example, this may be achieved through the engagement of male and female coupling parts, and/or by the coupling part and the rotatable drive part having one or more mutually cooperating surfaces.

The drive coupling may be configured for engaging a same rotatable drive part on the first and second sides of the device. Therefore, the drive coupling can engage the same rotatable drive part when the drive coupling is inverted. Thus, the direction of operation of the spring return device can easily be reversed by inverting the spring return device while the drive coupling is locked in position.

However, it is not essential for the drive coupling to be configured for engaging the same rotatable drive part on the first and second sides of the device. Instead, the drive coupling may be configured for engaging different (for example different sizes and/or shapes) drive parts on the first and second sides, and one or more adaptors may be provided for coupling the drive coupling to the different drive parts when the device is inverted. For example, the adaptor may convert a female coupling part having a first size bore to female coupling part having a second size bore, or a female coupling part to a male coupling part.

The first and second sides of the device are on opposite sides of the device, i.e. the may correspond to sides of the device that are located at opposite ends of the axis of rotation of the drive coupling.

The engagement between the spring and the drive coupling is such that the spring can apply a torque to the drive coupling. For example, the spring may be coupled to, or fixed to, or abut part of, or be received within part of the drive coupling. Typically an end of the spring may be engaged with an engagement part on a side surface of the drive coupling, for example a circumferential surface of the drive coupling. The engagement part may be an indent or a protrusion in the circumferential surface of the drive coupling that is abutted by an end surface of the spring to engage the spring with the drive coupling, or another type of single-sided, one-direction or one-way engagement part or catch.

Alternatively, the engagement part may be a two-direction engagement part. For example, the engagement part may be in the form of a slot for receiving an end part of the spring.

The spring may comprise a helical torsion spring. Thus, the spring may store mechanical energy when it is wound up by rotation of the drive coupling.

The spring may comprise a clock-spring. A clock-spring may correspond to a spiral-wound torsion spring.

The spring may comprise a band of resilient metal wound into a spiral shape.

Herein, mechanical energy stored by a spring may refer to energy stored by the spring in the form of potential energy.

The retainer may correspond to a part of the spring return device that functions to retain, or hold, or restrain, or house the spring. The retainer may prevent rotation of the whole of the spring relative to the retainer, so that the spring can be wound up within the retainer to store mechanical energy. A first end of the spring may be coupled to the retainer, whilst a second end of the spring may be engaged with the drive coupling.

The retainer may comprise a band, ring, or housing substantially surrounding the spring. The retainer may therefore substantially surround an outer circumference of the spring, i.e. the spring may be located inside the retainer. Thus, the retainer may contain the spring, i.e. prevent the spring from expanding outwards. The retainer may be substantially circular/cylindrical. The retainer may have one or more mounting parts for fixing the retainer to an actuator or to a mechanical device. The retainer may be substantially rigid, e.g. so that it cannot be easily deformed. The retainer may be made of metal and may be made by casting, moulding or extruding. Alternatively, the retainer may be made of a polymeric or plastic material, e.g. by moulding or 3D printing the retainer. Making the retainer out of a plastic material may provide for a more lightweight spring return device.

The drive coupling is rotatable relative to the retainer. Thus, the drive coupling may be connected to the retainer via a suitable rotatable connection. Rotation of the drive coupling relative to the retainer may mean that the drive coupling rotates while the retainer does not rotate.

The drive coupling is engaged with the spring such that rotation of the drive coupling relative to the retainer in the first direction causes mechanical energy to be stored in the spring. For example, rotation of the drive coupling in the first direction may cause the spring to be wound up, so that it stores mechanical energy.

The spring may thus be arranged to exert a torque on the drive coupling which acts against rotation of the drive coupling in the first direction, i.e. the spring may urge the drive coupling to rotate in the second direction.

Herein, a first and second directions of rotation may refer to respective ones of a clockwise direction and an anti-clockwise direction.

The limiter element is arranged to rotate with the drive coupling. Thus, the limiter element may be connected to or otherwise fixed relative to the drive coupling, so that the limiter element and the drive coupling may rotate together as one. In some cases, the limiter element may be formed as part of the drive coupling.

The first stopping surface is arranged to abut (e.g. engage) the first limiter surface on the limiter when the drive coupling is in a first predetermined rotational position relative to the retainer. The first stopping surface abutting against the first limiter surface blocks further rotation of the drive coupling in the second direction, i.e. the drive coupling is prevented by the first stopping surface from rotating further in the second direction. Thus, when the drive coupling is in the first predetermined position, the torque exerted by the spring on the drive coupling causes the first limiter surface to be pressed against the first stopping surface. As a result of the torque exerted by the spring on the drive coupling, the drive coupling may automatically return to the first predetermined rotational position when the drive coupling is allowed to rotate under action of the spring. In particular, when the drive coupling is rotated in the first direction (i.e. away from the first predetermined rotational position), energy is stored in the spring and the spring exerts a torque which urges the drive coupling back towards the first predetermined rotational position.

The first predetermined rotational position of the drive coupling may be defined by a position of the first stopping surface.

In some cases, the first predetermined rotational position may correspond to a predetermined state of a mechanical device that is coupled to the drive coupling (e.g. via a rotatable drive part). In this manner, the mechanical device may automatically be returned to the predetermined state (e.g. a closed state for a valve). Limiting rotation of the drive coupling in the second direction to the first predetermined rotational position may further serve to protect the mechanical device, by preventing the drive coupling from being rotated too far in the second direction (which might cause damage to the mechanical device).

The first stopping surface may, for example, be provided by a part of the retainer, or by any other suitable part whose position is fixed relative to the retainer. More generally, each of the one or more stopping surfaces may be provided by a respective part of the retainer, or by a part that is fixed relative to the retainer. The first stopping surface may have a shape that is complementary to a shape of the first limiter surface. This may ensure a good engagement between the first stopping surface and the first limiting surface, so that the first limiter surface can be effectively held against the first stopping surface.

The one or more stopping surfaces may further comprise a second stopping surface, the second stopping surface being arranged to abut a second limiter surface on the limiter when the first stopping surface abuts the first limiter surface on the limiter element. In other words, the second stopping surface may abut the second limiter surface when the drive coupling is in the first predetermined rotational position. Thus, the limiter element may include two limiter surfaces (the first and second limiter surfaces), which abut corresponding stopping surfaces when the drive coupling is in the first predetermined rotational position. This may improve a stability with which the drive coupling is held in the first predetermined rotational position, thus reducing a risk of sudden release of the spring's stored energy. In particular, providing pairs of surfaces which abut in this manner may reduce a risk of slippage between the surfaces when they abut one another.

The second stopping surface may have a shape that is complementary to a shape of the second limiter surface.

The limiter element may comprises a first arm on which the first limiter surface is disposed, and a second arm on which the second limiter surface is disposed. The limiter element may further comprise a central portion (e.g. a central plate), from which the first and second arms extend.

The first limiter surface and the second limiter surface may be arranged on opposite sides of the limiter element with respect to an axis of rotation of the drive coupling relative to the retainer. In this manner, when the drive coupling is in the first predetermined rotational position, the drive coupling may be held (supported) in this position via the first and second limiter surfaces which are on opposite sides of the axis of rotation of the drive coupling. This may improve a stability with which the drive coupling is held in the first predetermined rotational position. Correspondingly, the first stopping surface and the second stopping surface may be arranged on opposite sides of the retainer with respect to the axis of rotation of the drive coupling.

In some cases, the first limiter surface and the second limiter surface may be arranged such that they are substantially symmetrical about the axis of rotation of the drive coupling.

Where the limiter element includes first and second arms, the first arm and the second arm of the limiter element may extend respectively in opposing directions away from an axis of rotation of the drive coupling relative to the retainer. In other words, the first arm and the second arm may be aligned along an axis that passes through the axis of rotation of the drive coupling, the first arm and second arm being disposed on opposite sides of the limiter element with respect to the rotation axis of the drive coupling. In this manner, the first limiter surface and the second limiter surface may be arranged on opposite sides of the limiter element with respect to an axis of rotation of the drive coupling relative to the retainer.

The one or more stopping surfaces may further comprise a third stopping surface, the third stopping surface being arranged to abut a third limiter surface on the limiter element when the drive coupling is in a second predetermined rotational position, to thereby limit rotation of the drive coupling relative to the retainer in the first direction. Thus, when the drive coupling is in the second predetermined rotational position, the third limiter surface may abut the third stopping surface, such that further rotation of the drive coupling in the first direction is prevented. In this manner, the drive coupling is prevented from being rotated in the first direction beyond the second predetermined rotational position. Thus, the drive coupling may only be rotatable between the first predetermined rotational position and the second predetermined rotational position. In other words, a maximum angle of rotation of the drive coupling relative to the retainer may correspond to an angular spacing between the first and second predetermined rotational positions.

This may serve to ensure that the drive coupling is not rotated too far in the first direction, which might cause a large strain to be placed on the spring and/or retainer, as well as potentially cause damage to a mechanical device that is coupled to the drive coupling. This may also facilitate accurately moving the drive coupling to the first and second predetermined rotational states.

The second predetermined rotational position of the drive coupling may be defined by a position of the third stopping surface.

In some cases, the first predetermined rotational position may correspond to a first predetermined state of a mechanical device that is coupled to the drive coupling (e.g. via a rotatable drive part), and the second predetermined rotational position may correspond to a second predetermined state of the mechanical device. For example, where a valve is coupled to the drive coupling, the first predetermined rotational position may correspond to a closed state of the valve and the second predetermined rotational position may correspond to an open state of the valve.

The third stopping surface may have a shape that is complementary to a shape of the third limiter surface.

The third limiter surface may be disposed on a same arm of the limiter element as the first limiter surface, e.g. the first and third limiter surfaces may be on opposite sides of the arm.

The first stopping surface and the third stopping surface may be arranged to limit a maximum angle of rotation of the drive coupling relative to the retainer to an angle between 10°-140°. In other words, an angular spacing between the first and second predetermined rotational positions of the drive coupling may be between 10°-140°. Such an angular range of motion may enable the spring return device to be used with a wide range of different mechanical devices, which may typically require an angle of travel in this range. For example a typical valve (such as a ball valve) may have an angle of about 90° between its open and closed states. So, for instance, the first stopping surface and the third stopping surface may be arranged to limit the maximum angle of rotation of the drive coupling relative to the retainer to an angle of about 90° or more (e.g. 97°). In this manner, the spring return device may be effectively used with a typical valve such as a ball valve.

In a preferred example, the maximum angle of rotation of the drive coupling relative to the retainer may be limited to an angle between 80°-110°.

However, the maximum angle of rotation of the drive coupling relative to the retainer need not necessarily be limited to the ranges mentioned above, and can be adapted to a mechanical device with which the spring return device is used. For instance, the maximum angle of rotation of the drive coupling relative to the retainer may be limited to an angle in one of the following ranges: 80°-110°, 10°-140°, 10°-180°, 10°-270°, 10°-300°.

In some cases, the first stopping surface and the third stopping surface may be arranged to enable rotation of the drive coupling relative to the retainer through an angle near 360°, e.g. such that the drive coupling may be rotated by nearly one full revolution. For example, the maximum angle of rotation of the drive coupling relative to the retainer may be limited to an angle between 300°-360°. In some embodiments, such a large angle of rotation may be achieved by spacing two or more of the stopping surfaces in an axial direction, i.e. two or more of the stopping surfaces may be spaced apart along a direction parallel to the axis of rotation of the drive coupling. This may enable a limiter surface on the limiter element to pass under or over at least one of the stopping surfaces, thus enabling a greater range of rotation for the drive coupling.

The one or more stopping surfaces may further comprise a fourth stopping surface, the fourth stopping surface being arranged to abut a fourth limiter surface on the limiter when the third stopping surface abuts the third limiter surface on the limiter element. In other words, the fourth stopping surface may abut the fourth limiter surface when the drive coupling is in the second predetermined rotational position. Thus, the limiter element may include two limiter surfaces (the third and fourth limiter surfaces), which abut corresponding stopping surfaces when the drive coupling is in the second predetermined rotational position. This may improve a stability with which the drive coupling is held in the second predetermined rotational position, thus reducing a risk the drive coupling accidentally being rotated beyond the second predetermined rotational position. In particular, providing pairs of surfaces which abut in this manner may reduce a risk of slippage between the surfaces when they abut one another.

The fourth stopping surface may have a shape that is complementary to a shape of the fourth limiter surface.

The third limiter surface and the fourth limiter surface may be arranged on opposite sides of the limiter element with respect to an axis of rotation of the drive coupling relative to the retainer. In this manner, when the drive coupling is in the second predetermined rotational position, the drive coupling may be held (supported) in this position via the third and fourth limiter surfaces which are on opposite sides of the axis of rotation of the drive coupling. This may improve a stability with which the drive coupling is held in the second predetermined rotational position. Correspondingly, the third stopping surface and the fourth stopping surface may be arranged on opposite sides of the retainer with respect to the axis of rotation of the drive coupling.

Where the limiter element includes a first arm and a second arm, the third limiter surface may be disposed on the first arm of the limiter element, and the fourth limiter surface may be disposed on the second arm of the limiter element. This may provide a compact and sturdy construction for the limiter element. For example, the first limiter surface and the third limiter surface may be disposed on opposite sides of the first arm, and the second limiter surface and the fourth limiter surface may be disposed on opposite sides of the second arm.

The one or more stopping surfaces may be provided on one or more stopping elements which are removably connected to the retainer. In this manner, it may be possible to remove the one or more stopping elements, so that rotation of the drive coupling relative to the retainer is no longer limited by the one or more stopping surfaces. For instance, after coupling a mechanical device to the drive coupling (e.g. via a rotatable drive part), the one or more stopping elements may be removed to enable a greater range of rotation of the drive coupling. Then, prior to decoupling the mechanical device from the spring return device (e.g. to reverse a direction of operation of the spring return device), the one or more stopping elements may be re-connected to the retainer. In this manner, the drive coupling may be placed in the first predetermined rotational position (i.e. with the first stopping surface abutting the first limiter surface) before decoupling the mechanical device from the spring return device, so that energy remains stored in the spring. Thus, the benefits of the spring return device discussed above in terms of improved safety and its ability to store spring energy may be achieved, whilst also enabling an increased rotational range of the drive coupling. This may also enable the spring return device to be used with a wider range of mechanical devices, as an range of rotation of the drive coupling need not be limited once the spring return device is coupled to the mechanical device.

In one example, the first stopping surface may be provided on a first stopping element which is removably connected to the retainer.

The one or more stopping elements may be removably connected to the retainer using any suitable means. For example, the one or more stopping elements may be removably mounted or secured to the retainer. In some cases, a releasable fastener (e.g. a bolt, screw, clamp or other) may be used to secure a stopping element to the retainer. The retainer may include one or more mounting surfaces on which the one or more stopping elements are mounted.

Each of the one or more stopping elements may have a respective engagement portion which is engaged with a corresponding engagement portion in the retainer. This may facilitate removably connecting the one or more stopping elements to the retainer, and ensure that that the one or more stopping elements are accurately located relative to the retainer, to ensure accurate positioning of the one or more stopping surfaces. The engagement portions on the stopping elements and the retainer may have complementary shapes.

As an example, the engagement portion of each of the one or more stopping elements may be engaged in a respective slot in the retainer.

The limiter element may comprise a blocking surface arranged to block removal of the one or more stopping elements from the retainer when the first stopping surface abuts the first limiter surface on the limiter element. Thus, when the drive coupling is in the first predetermined rotational position, the blocking surface of the limiter element may prevent the one or more stopping elements from being removed from the retainer (i.e. from being disconnected from the retainer). This may ensure that the one or more stopping elements are not accidentally removed or do not otherwise fall out of the retainer when the drive coupling is in the first predetermined rotational position, which could result in a sudden release of the spring's stored energy. For instance, the blocking surface may be arranged to cover at least part of the one or more stopping elements when the drive coupling is in the first predetermined rotational position, to thereby block removal of the one or more stopping elements from the retainer.

The blocking surface may be arranged to block removal of a first stopping element on which the first stopping surface is provided, when the first stopping surface abuts the first limiter surface on the limiter element.

Where the one or more stopping surfaces comprise a first stopping surface and a third stopping surface (i.e. where the drive coupling is rotatable between the first and second predetermined rotational positions), the blocking surface may further be arranged to block removal of the one or more stopping elements when the third stopping surface abuts the third limiter surface (i.e. when the drive coupling is in the second predetermined rotational position). This may improve safety of the spring return device, by reducing a risk of the one or more stopping elements from being accidentally removed when the drive coupling is in the second predetermined rotational position.

The blocking surface may be arranged to allow removal of the one or more stopping elements from the retainer when the drive coupling is rotated away from the first predetermined rotational position, e.g. when the drive coupling is rotated in the first direction so that the first stopping surface no longer abuts the first limiter surface. For instance, the blocking surface comprises a gap or opening arranged to enable removal of the one or more stopping elements from the retainer when the limiter element is rotated away from a position where the first stopping surface abuts the first limiter surface.

Where the one or more stopping surfaces comprise a first stopping surface and a third stopping surface (i.e. where the drive coupling is rotatable between the first and second predetermined rotational positions), the blocking surface may be arranged to allow removal of the one or more stopping elements from the retainer when the drive coupling is at a position between (e.g. substantially mid-way between) the first and second predetermined rotational positions.

The one or more stopping elements may comprise a first stopping element on which the first stopping surface is provided, and a second stopping element on which the second stopping surface is provided.

The third stopping surface may be provided on the second stopping element, and the fourth stopping surface may be provided on the first stopping element. Thus, only a pair of stopping elements may be required to provide all four stopping surfaces. This may simplify a construction of the spring return device. As an example, the first stopping surface and the fourth stopping surface may be provided on opposite sides of the first stopping element, and the second stopping surface and third stopping surface may be provided on opposite sides of the second stopping element.

In some cases, the first and second stopping elements may be substantially symmetrical about an axis of rotation of the drive coupling relative to the retainer. This may facilitate a construction of the spring return device, as well as improve a stability with which the drive coupling can be held in the first and second predetermined rotational positions.

According to a second aspect of the invention, there is provided an apparatus comprising: a spring return device according to the first aspect of the invention; and a further device comprising a rotatable drive part, wherein the rotatable drive part is engaged with the drive coupling of the spring return device.

Thus, the spring return device may act as a fail-safe spring return that acts to return the rotatable drive part of the further device to a predetermined condition (e.g. rotational position) when the rotatable drive part is rotated away from that predetermined condition. Additionally, when the rotatable drive part is disengaged from the drive coupling, the drive coupling may be held in the first predetermined rotational position (due to abutment of the first stopping surface against the first limiter surface), such that an amount of energy remains stored in the spring. Thus, the spring return device may safely and easily be decoupled from the further device and its orientation inverted, in order to reverse a direction of operation of the spring return device.

The further device may comprise a driver mechanism having a rotatable driver part. Thus, the rotatable drive part may be a rotatable driver part of the driver mechanism. A driver mechanism may be any apparatus or device for driving rotation of the rotatable driver part, for example the driver mechanism may be an actuator, such as a rotary actuator.

The driver mechanism may comprise a powered rotary actuator. A rotary actuator is an actuator for causing rotation of a shaft. The rotary actuator may be manually powered, e.g. via a handle for applying a torque, or may be electrically, pneumatically, or hydraulically powered. When power is provided to the rotary actuator, the rotary actuator provides a torque to the rotatable drive part, and therefore to the drive coupling, that acts to rotate the drive coupling in a first direction against the torque provided by the spring. While sufficient power is supplied to the rotary actuator to balance the torque provided by the spring, the rotatable drive part and the drive coupling will remain in the same orientation. When the power to the rotary actuator is interrupted, the torque provided by the spring will cause the rotatable drive part and the drive coupling to rotate in an opposite second direction, to return the rotatable drive part and the drive coupling to a predetermined configuration.

The powered rotary actuator may comprise a pneumatic rotary actuator, or an electrical rotary actuator, or a hydraulic rotary actuator.

Alternatively, the driver mechanism may comprise a manually operated rotary actuator, for example that has a handle for a user to apply a torque to the rotatable driver part.

The apparatus may further comprise a mechanical device having a rotatable driven part, wherein the rotatable driven part is engaged with the drive coupling on an opposite side of the device to the rotatable driver part, so that the rotatable driver part and the rotatable driven part are coupled by the drive coupling.

Thus, the spring return device may act to return the rotatable driven part of the mechanical device to a predetermined rotational position when the rotatable driven part is rotated away from the predetermined rotational position. The predetermined rotational position may correspond to a safe or desired configuration of the mechanical device, for example a configuration in which a valve is open or closed.

The rotatable driven part may be directly coupled to the drive coupling. Alternatively, the rotatable driven part may be engaged with the drive coupling through a rotatable connecting part that is coupled to the rotatable driven part and to the drive coupling.

The rotatable driven part may be engaged with the drive coupling through an adaptor that converts a male coupling part (e.g. a protrusion or shaft) of the drive coupling to a female coupling part (e.g. an opening or bore), or a female coupling part of the drive coupling to a male coupling part, or a male coupling part of the drive coupling to a male coupling part having a different size and/or shape, or a female coupling part of the drive coupling to a female coupling part having a different size and/or shape.

Of course, the rotatable driver part of the actuator may also be engaged with the drive coupling through such an adaptor or other intermediate rotary part.

BRIEF DESCRIPTION OF THE DRAWINGS

Embodiments of the present invention will now be discussed, by way of example only, with reference to the accompanying Figures, in which:

FIG. 1b is a schematic rear view of the spring return device of FIG. 1a;

DETAILED DESCRIPTION; FURTHER OPTIONAL FEATURES

Figure 1A:
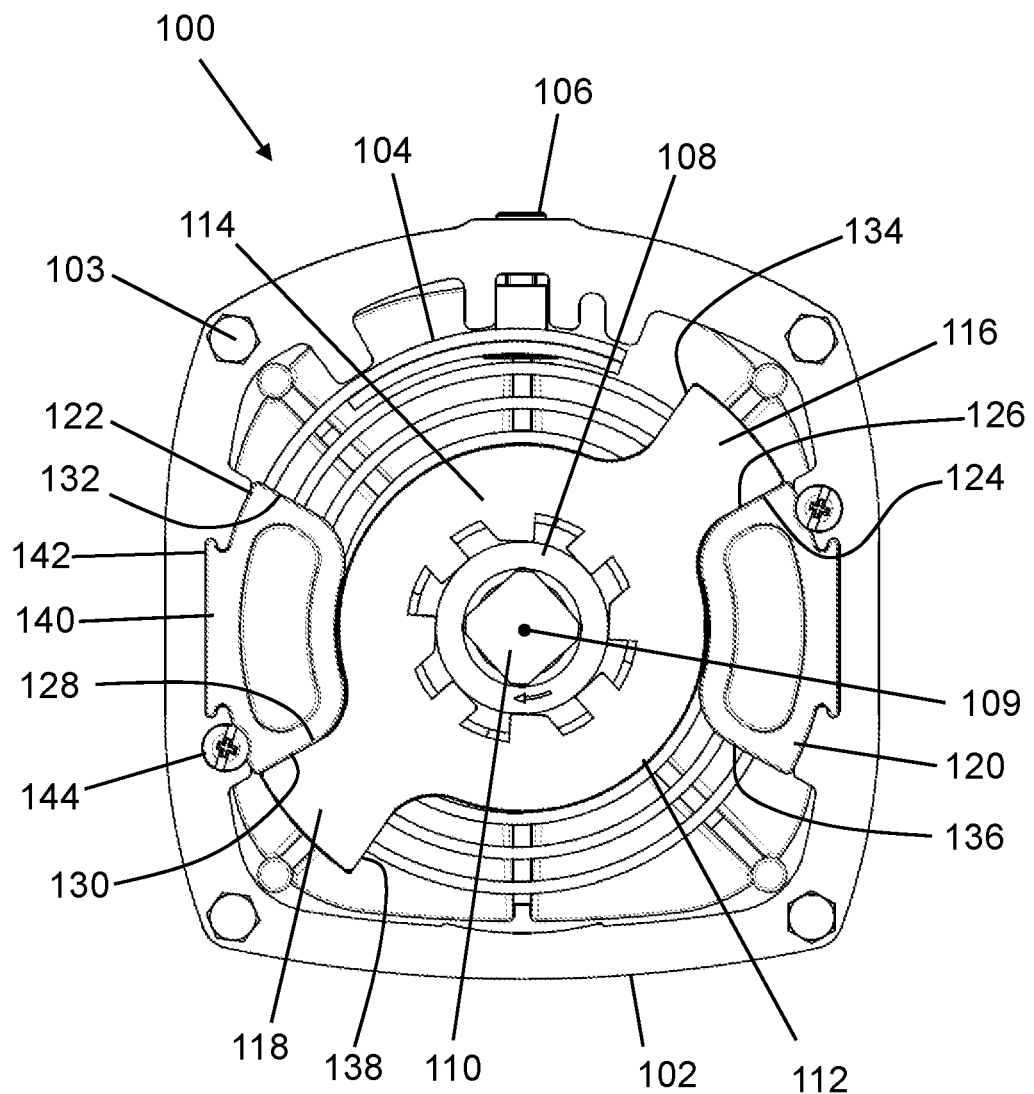
FIG. 1a is schematic front view of a spring return device according to an embodiment of the invention.
Figure 1B:
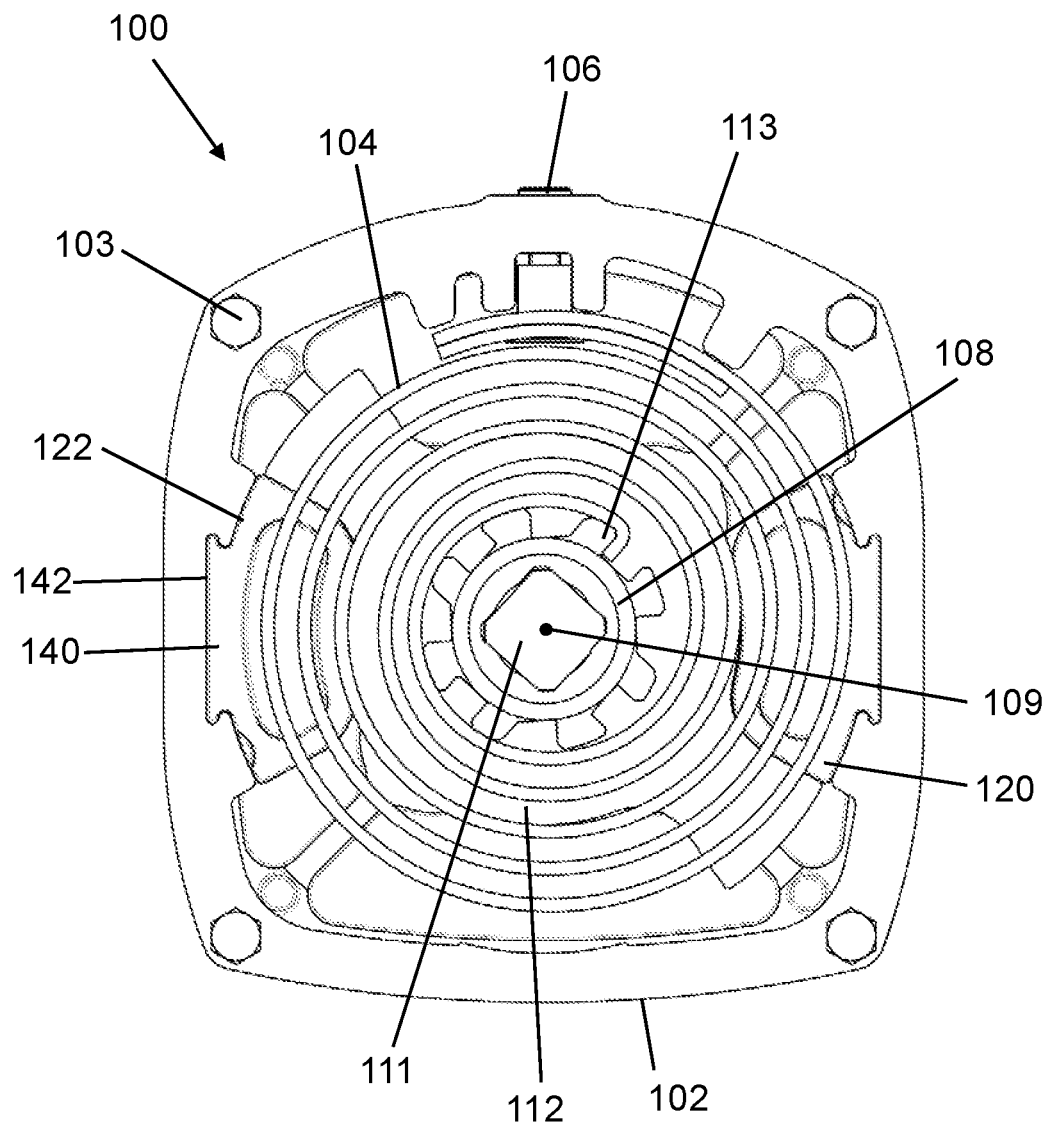

FIG. 1a shows a schematic front view of a spring return device 100 according to an embodiment of the invention. FIG. 1b shows a rear view of the spring return device 100. The spring return device 100 comprises a retainer in the form of a spring housing 102, in which is housed a spring 104. The spring housing 102 is generally in the form of a ring or band of material that surrounds the spring 104. The spring housing 102 is substantially rigid, e.g. it cannot be easily deformed. The spring housing 102 may be made of metal and may be made by casting, for example. For example, the spring housing 102 may be cast as a single piece from metal. Alternatively, the spring housing 102 may be made of a plastic material, e.g. by moulding or 3D printing. A series of holes 103 are formed around a periphery of the spring housing 102 for receiving screws or bolts for securing the device 100 to an actuator and/or to a mechanical device. In the example shown there are three such holes 103; of course, in other examples a different number of such holes 103 may be provided.

The spring 104 is a clock-spring which is formed from a band of resilient metal that is wound into a spiral shape. An outer surface of the spring 104 is fixed to the spring housing 102 by a retaining screw 106, which extends through a threaded portion of the spring housing 102 from an outside thereof to an inside thereof, where it engages the spring 104. The retaining screw 106 can be adjusted from an outside of the spring housing 102, for example if a user wants to disengage the retaining screw 106 from the spring 104 to disassemble the device 100.

A rotatable drive coupling 108 is positioned at a centre of the spring housing 102. The drive coupling 108 is rotatable relative to the spring housing 102, about a central axis of the drive coupling 108. In other words, the drive coupling 108 can be rotated about is central axis while the spring housing 102 remains stationary. A location of the central axis of the drive coupling 108 is indicated in FIGS. 1a and 1b by point 109. The central axis of the drive coupling 108 extends in a direction normal to the page in FIGS. 1a and 1b.

As depicted in FIG. 1a, the drive coupling 108 has a first opening 110 on a front side of the device 100 for releasably engaging a rotatable shaft. The drive coupling 108 also has a second opening 111 (shown in FIG. 1b), which is on a rear side of the device 100 (opposite to the front side) for releasably engaging a rotatable shaft. The first opening 110 and the second opening 111 both have an approximately square shape, so that they each may releasably engage a rotatable shaft having a corresponding square cross-section. However, other shapes may be used for the first and second openings 110, 111, and these may be adapted to the rotatable shafts that they are intended to releasably engage. The first and second openings are discussed further below. The front and rear sides of the device 100 correspond to sides of the device 100 which are located at opposite ends of the central axis of the drive coupling 108.

As shown in FIG. 1b, the spring 104 is engaged with a side of the drive coupling 108. Specifically, an end of the spring 104 is engaged with an engagement part 113 on the side of the drive coupling 108 so that when the drive coupling 108 is rotated in a first direction (anti-clockwise in the view of FIG. 1a, clockwise in the view of FIG. 1b) the spring 104 is wound up within the spring housing 102 and stores mechanical energy. The engagement part 113 on the side of the drive coupling 108 comprises a surface (e.g. a side or edge surface) of an indent or a protrusion on the side of the drive coupling 108. In some embodiments, the engagement part may be a single-sided, one-way or one-direction engagement part that engages the end of the spring 104 in a single direction only, for example in the clockwise direction or in the anti-clockwise direction. For example, the engagement part may be a raised or recessed edge or wall for abutting an end of the clock-spring in the single direction. In some embodiments there may be three such engagement parts. However, in other embodiments there may be a different number of engagement parts.

When wound up in this way (e.g. by rotating the drive coupling 108 in the first direction), the spring 104 applies a torque to the drive coupling 108 in a second direction (clockwise view of FIG. 1a, anti-clockwise in the view of FIG. 1b) that acts to rotate the drive coupling 108 in the second direction (unless this torque is balanced by a corresponding torque in the first direction). The spring 104 therefore acts to resist rotation of the drive coupling 108 in the first direction.

The spring return device 100 further includes a limiter element 112 which is connected to the drive coupling 108 and arranged to rotate with the drive coupling 108. In other words, the drive coupling 108 and limiter element 112 rotate together as one. The limiter element 112 is arranged at the front side of the device 100, such that it is disposed around the first opening 110 of the drive coupling 108. In some embodiments, the limiter element 112 may be formed integrally with the drive coupling 108, i.e. the limiter element 112 and the drive coupling 108 may be formed as a single component. For example, the drive coupling 108 and limiter element 112 may be cast or moulded as a single piece of metal. Alternatively, the limiter element 112 may be formed separately from the drive coupling 108, and secured to the drive coupling via any suitable means (e.g. with an adhesive, mechanical fastener, or a soldered or welded joint).

The limiter element 112 comprises a central plate 114 which is disposed around the drive coupling 108 and connected to the drive coupling 108. As shown in FIG. 1a, the central plate 114 may have a substantially circular shape which is centred about the central axis of the drive coupling 108. Additionally, the limiter element 112 comprises a first arm 116 and a second arm 118 which extend outwards from the central plate 114. The first arm 116 and second arm 118 extend from diametrically opposite sides of the central plate 114, and are arranged such that they are substantially symmetrical about the central axis of the drive coupling 108. The first arm 116 and second arm 118 may both have "dovetail" shapes, as shown in FIG. 1a, i.e. a width of the first and second arms may increase away from the central plate 114.

A first stopping element 120 and a second stopping element 122 are mounted in the spring housing 102, and arranged to limit a range of rotation of the drive coupling 108 relative to the spring housing 102. In particular, the first stopping element 120 has a first stopping surface 124 which is arranged to abut a first limiter surface 126 on the first arm 116 of the limiter element 112 when the drive coupling 108 is in a first predetermined rotational position, to thereby limit rotation of the drive coupling in the second direction (i.e. the clockwise direction in FIG. 1a). Additionally, the second stopping element 122 has a second stopping surface 128 arranged to abut a second limiter surface 130 on the second arm 118 of the limiter element 112 when the drive coupling is in the first predetermined rotational position. FIG. 1a illustrates a configuration of the device 100 where the drive coupling 108 is in the first predetermined rotational position: as can be seen, the first stopping surface 124 abuts the first limiter surface 126 and the second stopping surface 128 abuts the second limiter surface 130.

Due to the abutment between the stopping surfaces and the limiter surfaces when the drive coupling 108 is in the first predetermined rotational position, the drive coupling 108 is prevented for rotating further in the second direction. This prevents the drive coupling 108 from freely rotating in the second direction under action of the spring 104, which could result in the spring 104 completely unwinding and releasing all of its stored energy. Accordingly, when no torque is provided to the drive coupling 108 in order to overcome the torque exerted by the spring 104, the torque from the spring 104 causes the drive coupling to be held in the first predetermined rotational position. Thus, energy may remain stored in the spring 104, without a risk sudden release of the energy stored in the spring. This may facilitate engaging and disengaging the drive coupling 108 with a rotatable drive part, e.g. in order to reverse a direction of action of the device 100, as discussed in more detail below. Furthermore, by providing a pair of stopping surfaces (i.e. the first and second stopping surfaces) which abut a corresponding pair of limiter surfaces (i.e. the first and second limiter surfaces) to hold the drive coupling in the first predetermined rotational position, a stability with which the drive coupling 108 is held in the first predetermined rotational position may be improved. As the first and second arms of the limiter element 112 extend from diametrically opposite sides of the central plate 114, first limiter surface 126 and the second limiter surface 130 may act to hold the drive coupling 108 in the first predetermined position at diametrically opposite points around the axis of rotation of the drive coupling 108, which may further improve the stability with which it can be held in the first predetermined rotational position. The second stopping element 122 further includes a third stopping surface 132 which is arranged to abut a third limiter surface 134 on the first arm 116 of the limiter element 112 when the drive coupling 108 is in a second predetermined rotational position, to thereby limit rotation of the drive coupling in the first direction (i.e. the anti-clockwise direction in FIG. 1a). The first stopping element 120 also has a fourth stopping surface 136 arranged to abut a fourth limiter surface 138 on the second arm 118 of the limiter element 112 when the drive coupling 108 is in the second predetermined rotational position. Thus, when a torque is applied to the drive coupling 108 to overcome the torque from the spring 104, the drive coupling may be rotated in the first direction until it reaches the second predetermined position, where the third stopping surface 132 abuts the third limiter surface 134 and the fourth stopping surface 136 abuts the fourth limiter surface 138. This prevents rotation of the drive coupling 108 in the first direction beyond the second predetermined rotational position. This may serve to prevent the spring 104 from being wound up too tightly, which could result in damage to the spring return device 100. This may also serve to protect a mechanical device which is engaged with the spring return device 100, e.g. by ensuring that the drive coupling 108 is not rotated beyond an operational range of the mechanical device.

Accordingly, the drive coupling 108 may be rotated between the first and second predetermined rotational positions, i.e. the drive coupling 108 can be rotated through an angle corresponding to an angular offset between the first and second predetermined rotational positions. The positions and shapes of the first and second stopping elements 120, 122, as well as the geometry of the first and second arms 116, 118 of the limiter element 112, may serve to define the first and second predetermined rotational positions. In the example shown in FIGS. 1a and 1b, an angular offset of the first and second predetermined rotational positions is approximately 97°, i.e. the drive coupling 108 can be rotated relative to the spring housing 102 by a maximum angle of approximately 97°. More generally, the first and second predetermined rotational positions may be defined such that a maximum angle of rotation of the drive coupling 108 relative to the spring housing 102 is adapted to a mechanical device with which the spring return device 100 is used. For example, the maximum angle of rotation of the drive coupling 108 relative to the spring housing 102 may be limited to an angle that is in a range of 10°-140°. Such an angular range of motion may enable the spring return device 100 to be used with a wide range of different mechanical devices, which may typically require an angle of travel in this range. Similarly to the discussion above in relation to the first predetermined rotational position, the arrangement of the third and fourth limiter surfaces on the first and second arms of the limiter element 112 may serve to improve a stability with which the drive coupling 108 can be held in the second predetermined rotational position.

The first stopping element 120 and the second stopping element 122 are each removably mounted in the spring housing 102. In this manner, they can be removed from the spring housing 102, so that they no longer limit rotation of the drive coupling 108. For example, following the engagement of a rotatable drive part with the drive coupling 108, the first and second stopping elements 120, 122 may be removed to enable a wider range of rotation for the drive coupling 108. More specifically, each of the first and second stopping elements 120, 122 includes a respective engagement portion 140 which is engaged in a corresponding slot 142 formed in a side of the spring housing 102. The engagement portion 140 has a shape that is complementary to a shape of the slot 142, to ensure accurate location of the stopping elements in the spring housing 102. Additionally, each of the first and second stopping elements 120, 122 is held in the slot 142 by means of a respective screw 144 which passes through part of the spring housing 102. To remove the stopping elements 120, 122, the screws 144 may be removed so that they can be slid out of their slots 142. Of course, other means for removably mounting the stopping elements to the spring housing 102 may be used. In some embodiments (not shown) the first and second stopping elements 120, 122 may be formed as part of the spring housing 102, i.e. they may not be removable from the spring housing 102.

It should be noted that, in different embodiments, different arrangements of the limiter element 112 and of the stopping elements may be used, in order to limit rotation of the drive coupling 108 relative to the spring housing 102. For example, more or fewer stopping elements may be used, with the limiter element 112 being adapted accordingly.

Figure 2:
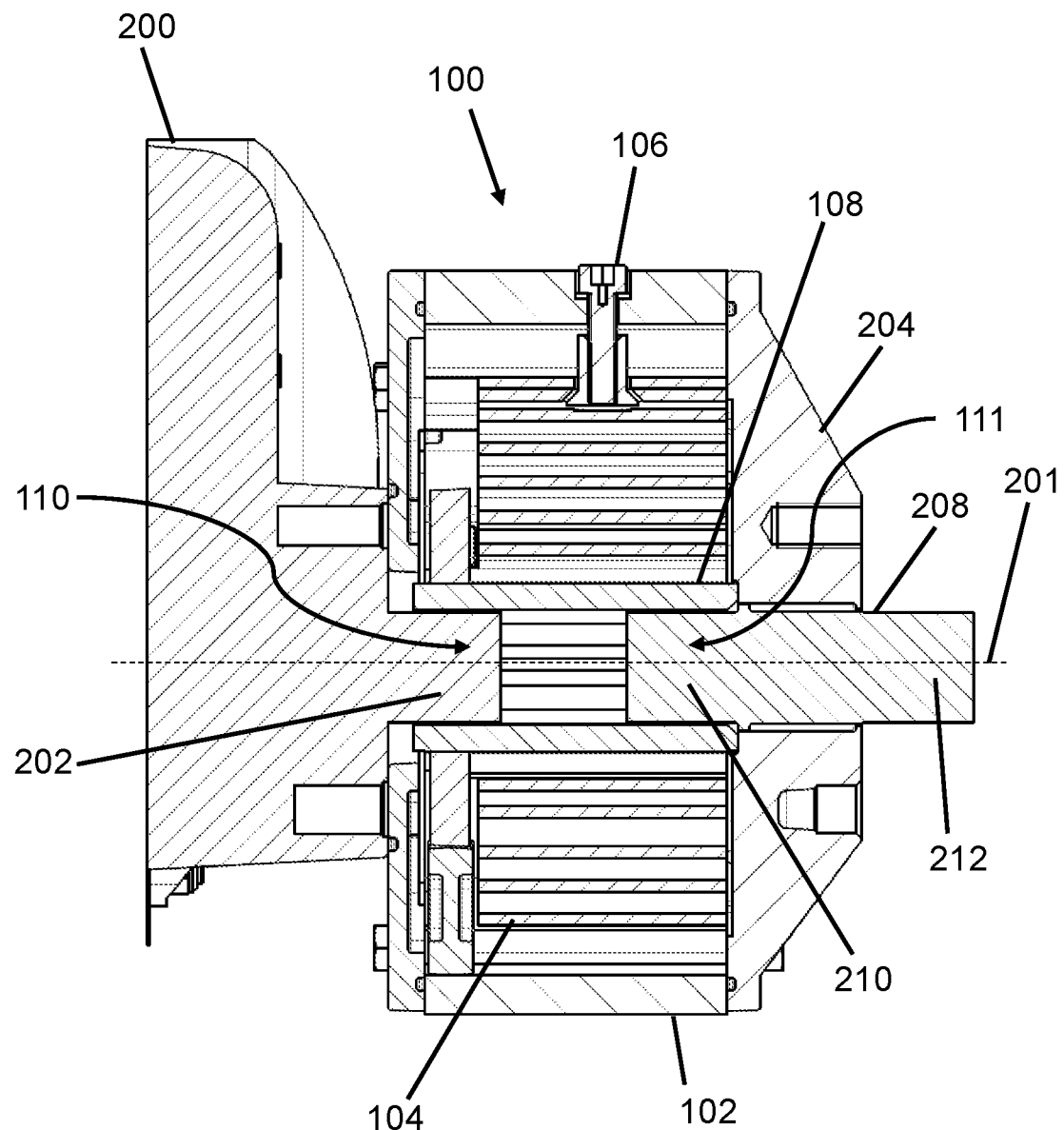
FIG. 2 is a schematic side cross-sectional view of the spring return device of FIG. 1a coupled to a rotary actuator.
Figure 3:
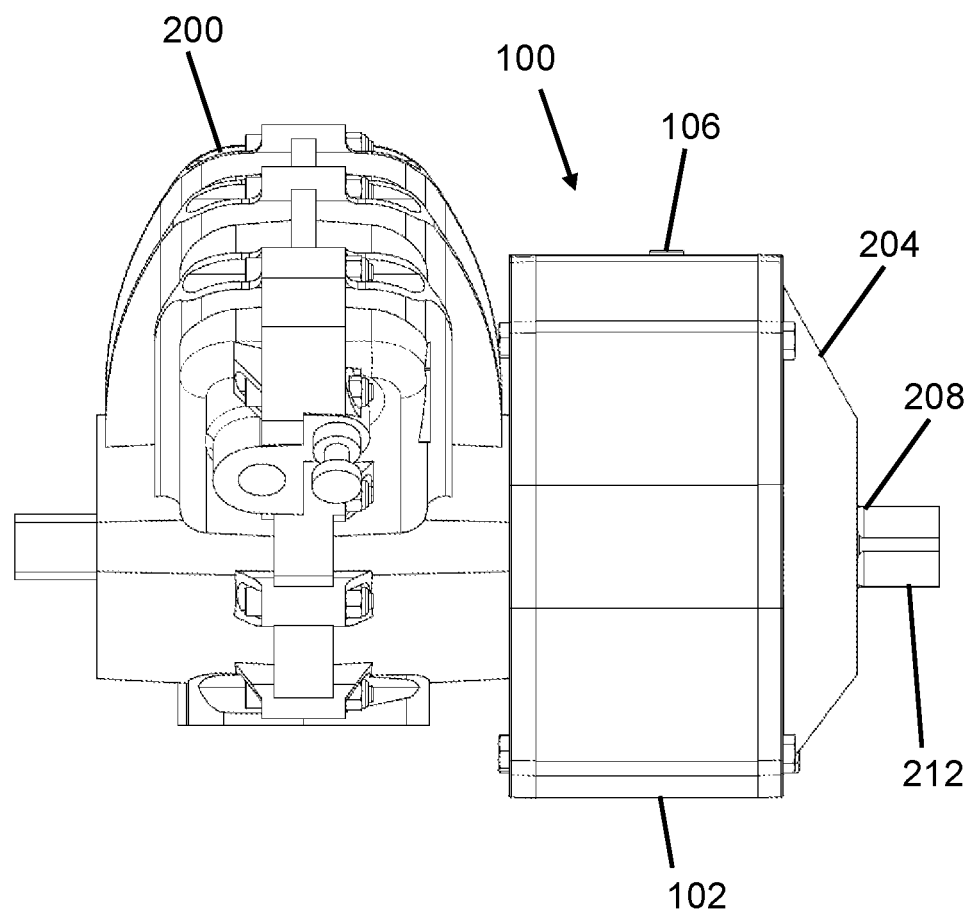
FIG. 3 is a schematic perspective side view of the spring return device of FIG. 1a coupled to a rotary actuator.

FIG. 2 shows a side cross-sectional view of the spring return device 100 which is coupled to a rotary actuator 200. FIG. 3 shows a side perspective view of the spring return device 100 and the rotary actuator 200. Together, the spring return device 100 and the rotary actuator 200 may constitute an apparatus according to an embodiment of the invention. The rotatory actuator 200 is coupled to the device 100 on the front side of the device. The rotary actuator 200 may be a powered device that causes rotation of a rotary driver shaft 202 using some form of power, for example electrical power, pneumatic power or hydraulic power. The rotary actuator 200 is configured to provide a torque on the rotary driver shaft 202 while power is supplied to the rotary actuator 200.

As shown in FIG. 2, the rotary driver shaft 202 of the rotary actuator 200 is engaged with the drive coupling 108 of the device 100 by the rotary driver shaft 202 being received in the first opening 110 of the driver coupling 108. The engagement is such that any torque applied to the rotary driver shaft 202 is also applied to the drive coupling 108. This is achieved by the rotary driver shaft 202 and the first opening 110 having cooperating shapes. The central axis of the drive coupling 208, about which it is rotatable, is indicated by dashed line 201 in FIG. 2.

As shown in FIG. 2, the device 100 is also coupled to an adaptor 204 on the rear side of the device 100, such that the rotary actuator 200 and the adaptor 204 are coupled to opposite sides of the device 100. The adaptor 204 is configured to convert the second opening 111 of the drive coupling 108 (i.e. a female coupling part) to a rotatable shaft coupling part (i.e. a male coupling part). In this manner, the adaptor 204 can then be engaged with a mechanical device that requires a male coupling part input to its drive mechanism. This is achieved by the adaptor having a rotatable connector 208 which at a first end has a first male coupling part (i.e. a shaft) 210 for engaging the second opening 111 of the drive coupling 108 and at a second end has a second male coupling part 212 (i.e. a second shaft) for being coupled to the drive mechanism of a mechanical device. The size and/or shape of the second male coupling part 212 may be different to the size and/or shape of the first male coupling part 210, and is chosen depending on the drive mechanism of the mechanical device to which the second male coupling part 212 is to be engaged.

In the example of FIG. 2, the first and second openings 110, 111 of the drive coupling 108 have the same size and shape, i.e. they are corresponding or equivalent openings. The end of the rotary driver shaft 202 and the end of the first male coupling part 210 also have the same size and shape, and this size and shape cooperates with the size and shape of the openings 110, 111 so they can be engaged with the openings. Thus, the rotary driver shaft 202 can be engaged with either of the openings 110, 111 and the first male coupling part 210 can also be engaged with either of the openings 110, 111. This may facilitate reversing a direction of operation of the device 100. However, it is not essential for the end of rotary driver shaft 202 and the end of the first male coupling part 210 to be identical. For example, the lengths of the end of the rotary driver shaft 202 and the end of the first male coupling part 210 may be different, e.g. for strength reasons.

The rotary actuator 200 may exert a torque on the rotary driver shaft 202, in order to rotate the drive coupling 108, which causes a corresponding rotation of the rotatable connector 208, so that the rotation may be transmitted to a mechanical device that is coupled to the rotatable connector 208. The rotary actuator 200 may exert a torque on the rotary driver shaft 202 in the first direction, which rotates the drive coupling 108 in the first direction and stores energy in the spring 104. The drive coupling 108 may be rotated in the first direction until it reaches the second predetermined rotational position. While power is provided to the rotary actuator 200, the torque provided by the spring 104 may be balanced by the torque provided by the rotary actuator 200. If the power supplied to the rotary actuator 200 is interrupted, the torque provided by the spring 104 will rotate the drive coupling 108, and therefore also the rotary driver shaft 202 and the rotatable connector 208, in the second direction. Thus, the spring return device 100 may act as a fail-safe device to reset the rotatable connector 208 to a predetermined condition if power is interrupted to the rotary actuator 200. In some cases, the drive coupling 108 may return to the first predetermined rotational position when power is interrupted to the rotary actuator 200. Similar, if the device 100 was suddenly disengaged from the rotary actuator 200, the drive coupling may return to the first predetermined rotational position and be held in that position by the spring 104.

As discussed above, when the drive coupling is in the first predetermined rotational position, further rotation in the second direction is prevented, such that any further discharge of energy by the spring 104 is prevented. Thus, the spring return device 100 may be kept in a state where energy is safely stored in the spring 104, even when power to the rotary actuator 200 is interrupted or when the rotary actuator 200 is disengaged from the device 100. This may facilitate inverting an orientation of the device 100, in order to reverse a direction of operation of the device 100.

In order to reverse the direction of operation of the device 100, power to the rotary actuator 200 may first be interrupted, so that it no longer applies any torque to the rotary driver shaft 202. As a result, the drive coupling 108 will automatically return to the first predetermined rotational position, where it will due to the torque exerted by the spring 104. Then, the rotary driver shaft 202 may be disengaged from first opening 110, and the rotatable connector 208 of the adaptor 204 may be disengaged from the second opening 111. Following this, the orientation of the device 100 may be inverted, e.g. if may be flipped back-to-front, so that its rear side now faces the rotary actuator 200 and its front side now faces the adaptor 204. Finally, the rotary driver shaft 202 may be engaged in the second opening 111, and the rotatable connector 208 may be engaged in the first opening 210. In this manner, the direction of operation of the device 100 will be reversed compared to the previously. So, for example, where in the spring 104 may have previously resulted in a torque being applied to the rotary driver shaft 202 in the clockwise direction, following inverting of the device 100 the spring 104 may result in a torque being applied to the rotary driver shaft 202 in the anti-clockwise direction. Thus, the direction of operation of the device 100 can easily and safely be reversed, whilst keeping energy stored in the spring and without a risk of sudden release of the stored energy.

Figure 4A:
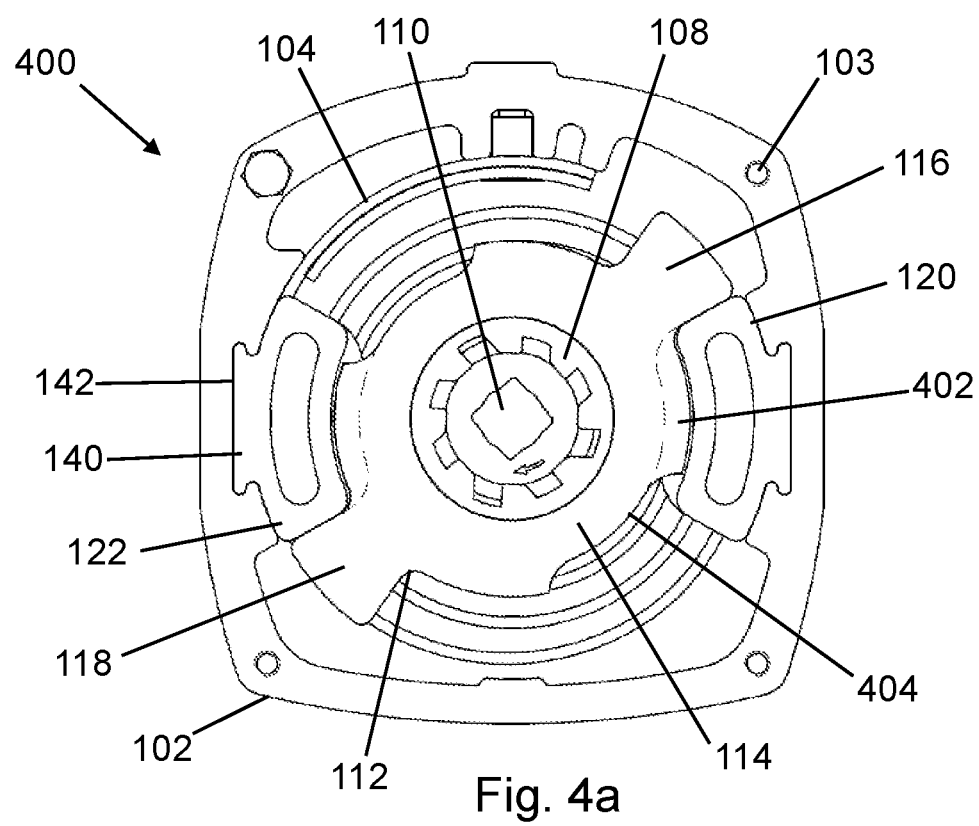
FIGS. 4a and 4b are schematic front views of a spring return device according to an embodiment of the invention.
Figure 4B:
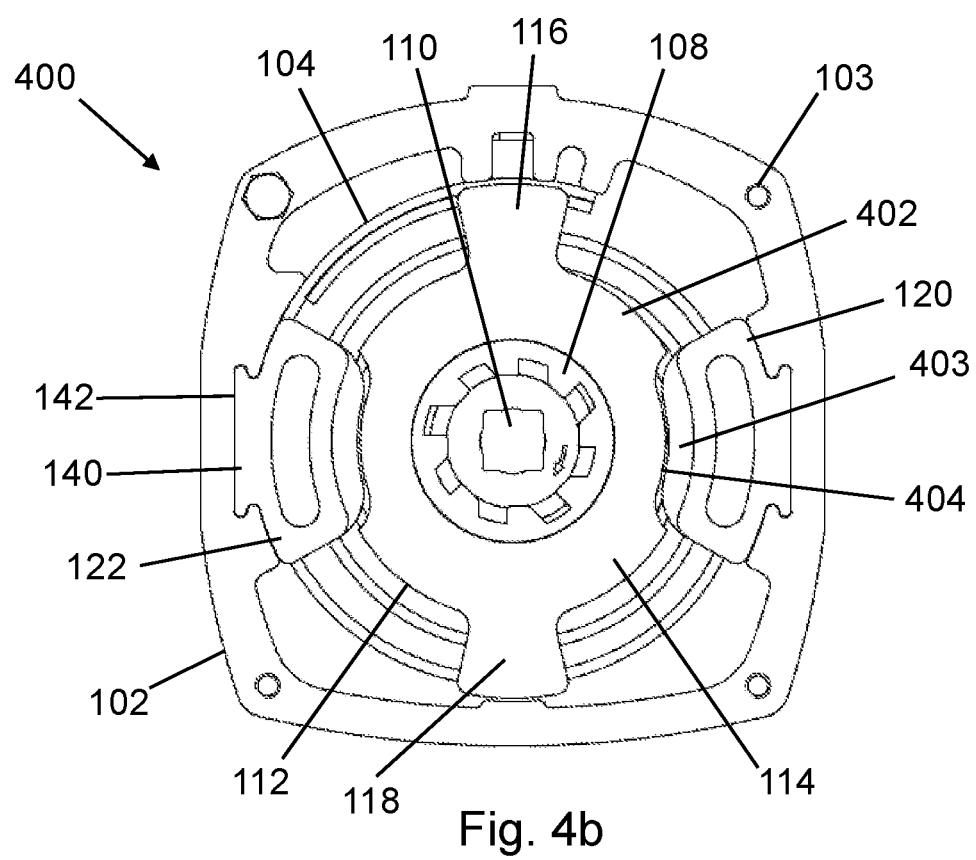

FIGS. 4a and 4b show schematic front views of a spring return device 400 according to an embodiment of the invention. The spring return device 400 is similar to the device 100 described above, and any features discussed above in relation to device 100 may also be applied to the device 400. For convenience, features of the device 400 which correspond to features of the device 100 discussed above are indicated in FIGS. 4a and 4b using the same reference numerals as in FIGS. 1a and 1b, and are not described again. For illustration purposes, the stopping surfaces and the limiter surfaces of the device 400 are not indicated in FIGS. 4a and 4b; however, they are arranged in a similar manner to the stopping surfaces an limiter surfaces discussed above in relation to the device 100.

In contrast to the device 100, in the device 400, the first stopping element 120 and the second stopping element 122 are not held in the spring housing 102 by a screw. Instead, in the device 400, the first stopping element 120 and the second stopping element 122 are held in the spring housing 102 due to frictional engagement of the engagement portions 140 of the first and second stopping elements 120, 122 in the corresponding slots 142 in the spring housing 102.

FIG. 4a shows a configuration of the device 400 where the drive coupling 108 of the device 400 is in the first predetermined rotational position. As can be seen, the limiter element 112 of the device 400 comprises a blocking surface 402, which is arranged to block removal of the first and second stopping elements 120, 122 when the drive coupling 108 is in the first predetermined rotational position. In particular, the blocking surface 402 is arranged to cover (e.g. overlie) respective portions 403 of the first and second stopping elements 120, 122, as illustrated by the dashed lines in FIG. 4a. As a result, the first and second stopping elements 120, 122 are prevented from being removed whilst the drive coupling 108 is in the first predetermined rotational position. This avoids the risk of the first and second stopping elements 120, 122 accidentally falling out or being removed when the drive coupling 108 is in the first predetermined rotational position, which could result in a sudden release of the spring's stored energy. Similarly, the blocking surface 402 is arranged to block removal of the first and second stopping elements 120, 122 when the drive coupling 108 is in the second predetermined rotational position. Thus, when the drive coupling 108 is in the second predetermined rotational position, the blocking surface is arranged to cover (e.g. overlie) the respective portions 403 of the first and second stopping elements 120, 122. This may serve to ensure that the drive coupling 108 can be reliably held in the second predetermined rotational position, without the first and second stopping elements 120, 122 accidentally falling out or being removed from the spring housing 102.

The blocking surface 402 on the limiter element 112 is arranged to allow removal of the first and second stopping elements 120, 122 when the drive coupling 108 is approximately mid-way between the first and second predetermined rotational positions. FIG. 4b illustrates a configuration of the device 400 where the drive coupling 108 is positioned approximately mid-way between the first and second predetermined rotational positions. As can be seen in FIG. 4b, a pair of gaps 404 are formed in the blocking surface 402, and arranged to allow the first and second stopping elements 120, 122 to be removed when the drive coupling 108 is in the illustrated position. In particular, the gaps 404 are arranged such that the respective portions 403 of the first and second stopping elements 120, 122 are no longer covered by the blocking surface 402 (i.e. they are left exposed) when the drive coupling 108 is rotated to a position mid-way between the first and second predetermined rotational positions.

The configuration of spring return device 400 may facilitate installation and removal of the first and second stopping elements 120, 122, as no tools may be required to mount them in the spring housing 102. As an example, once a further device (e.g. rotary actuator 200) has been coupled with the spring return device 400, the drive coupling 108 may be rotated to the position illustrated in FIG. 4b, at which point the first and second stopping elements 120, 122 may be safely removed. With the first and second stopping elements 120, 122 removed, the drive coupling 108 may be rotated through a much larger angular range, as it is no longer limited by the stopping elements. Then, when the further device is to be decoupled from the spring return device 400, the drive coupling 108 may again be rotated to the position illustrated in FIG. 4b, so that the first and second stopping elements 120, 122 can be re-mounted in the spring frame 102. Once the first and second stopping elements 120, 122 are in place, the further device can safely be decoupled from the spring return device 400, without risking a sudden release of all the energy stored in the spring 104.

The invention claimed is:

1. A spring return device comprising:
   a rotatable drive coupling configured for releasably engaging a rotatable drive part on a first side of the device and configured for releasably engaging a rotatable drive part on an opposite second side of the device;
   a spring engaged with the drive coupling;
   a retainer that retains the spring, wherein the drive coupling is rotatable relative to the retainer, and wherein rotation of the drive coupling relative to the retainer in a first direction causes mechanical energy to be stored in the spring;
   a limiter element that is arranged to rotate with the drive coupling; and
   one or more stopping surfaces comprising a first stopping surface arranged to abut a first limiter surface on the limiter element when the drive coupling is in a first predetermined rotational position, to thereby limit rotation of the drive coupling relative to the retainer in a second direction, the second direction being opposite to the first direction.

2. The spring return device according to claim 1, wherein the one or more stopping surfaces further comprises a second stopping surface, the second stopping surface being arranged to abut a second limiter surface on the limiter when the first stopping surface abuts the first limiter surface on the limiter element.

3. The spring return device according to claim 2, wherein the limiter element comprises a first arm on which the first limiter surface is disposed, and a second arm on which the second limiter surface is disposed.

4. The spring return device according to claim 3, wherein the third limiter surface is disposed on the first arm of the limiter element, and wherein the fourth limiter surface is disposed on the second arm of the limiter element.

5. The spring return device according to claim 2, wherein the first limiter surface and the second limiter surface are arranged on opposite sides of the limiter element with respect to an axis of rotation of the drive coupling relative to the retainer.

6. The spring return device according to claim 5, wherein the third limiter surface is disposed on the first arm of the limiter element, and wherein the fourth limiter surface is disposed on the second arm of the limiter element.

7. The spring return device according to claim 2, wherein the one or more stopping surfaces are provided on one or more stopping elements, the stopping elements comprise a first stopping element on which the first stopping surface is provided, and a second stopping element on which the second stopping surface is provided.

8. The spring return device according to claim 7, wherein the first stopping element and the second stopping element are arranged substantially symmetrically about an axis of rotation of the drive coupling relative to the retainer.

9. The spring return device according to claim 7, wherein the third stopping surface is provided on the second stopping element, and the fourth stopping surface is provided on the first stopping element.

10. The spring return device according to claim 1, wherein the one or more stopping surfaces further comprises a third stopping surface, the third stopping surface being arranged to abut a third limiter surface on the limiter element when the drive coupling is in a second predetermined rotational position, to thereby limit rotation of the drive coupling relative to the retainer in the first direction.

11. The spring return device according to claim 10, wherein the first stopping surface and the third stopping surface are arranged to limit a maximum angle of rotation of the drive coupling relative to the retainer to an angle between 10°-140°.

12. The spring return device according to claim 10, wherein the one or more stopping surfaces further comprises a fourth stopping surface, the fourth stopping surface being arranged to abut a fourth limiter surface on the limiter when the third stopping surface abuts the third limiter surface on the limiter element.

13. The spring return device according to claim 12, wherein one or more stopping elements are provided on a first stopping element and a second element, respectively, the third stopping surface is provided on the second stopping element, and the fourth stopping surface is provided on the first stopping element.

14. The spring return device according to claim 12, wherein the third limiter surface is disposed on the first arm of the limiter element, and wherein the fourth limiter surface is disposed on the second arm of the limiter element.

15. The spring return device according to claim 1, wherein the one or more stopping surfaces are provided on one or more stopping elements which are removably connected to the retainer.

16. The spring return device according to claim 15, wherein each of the one or more stopping elements has a respective engagement portion which is engaged with a corresponding engagement portion in the retainer.

17. The spring return device according to claim 15, wherein the limiter element comprises a blocking surface arranged to block removal of the one or more stopping elements from the retainer when the first stopping surface abuts the first limiter surface on the limiter element.

18. The spring return device according to claim 17, wherein blocking surface is arranged to allow removal of the one or more stopping elements from the retainer when the drive coupling is rotated away from the first predetermined rotational position.

19. The spring return device according to claim 15, wherein the one or more stopping elements comprise a first stopping element on which the first stopping surface is provided, and a second stopping element on which the second stopping surface is provided.

20. An apparatus comprising:
the spring return device according to claim 1; and
a further device comprising a rotatable drive part, wherein the rotatable drive part is engaged with the drive coupling of the spring return device.

* * * * *